United States Patent Office 3,119,872
Patented Jan. 28, 1964

3,119,872
PROCESS FOR ALIPHATIC 1,3-DIAMINES
Francis L. Scott, Elkins Park, Pa., assignor to Pennsalt Chemicals Corporation, Philadelphia, Pa., a corporation of Pennsylvania
No Drawing. Filed Oct. 5, 1960, Ser. No. 60,573
9 Claims. (Cl. 260—583)

This invention deals with a novel process for the production of aliphatic 1,3-diamines. More particularly, this invention relates to condensation of hydrazine with an $\alpha,\beta$-ethylenically unsaturated aldehyde or ketone and catalytic hydrogenation of the condensate formed to an aliphatic 1,3-diamine.

Aliphatic diamines are a well known class of compounds which have numerous applications. For certain uses, such as for chelating agents and anti-corrosion additives, aliphatic 1,3-diamines are particularly important. Numerous methods exist for the preparation of these compounds, but only a very limited number of these processes have any commercial value. Those methods which are used commercially are based on high or moderately high pressure ammonia reactions. Thus, for example, U.S. 2,452,602 describes the preparation of aliphatic diamines by maintaining an amminating agent such as ammonia or a primary aliphatic amine in large excess and under pressure of hydrogen while an $\alpha,\beta$-unsaturated aldehyde or ketone is added, and then catalytically hydrogenating the condensation product at pressures from 600 to 1800 pounds per square inch.

It is also known in the chemical art that hydrazine will condense with an $\alpha,\beta$-ethylenically unsaturated aldehyde (e.g. crotonaldehyde). The reaction product obtained by the process may be a pyrazoline which can be isolated and characterized. It is further known that pyrazolines can be cleaved to 1,3-diamines by hydrogenation at high pressures using a Raney nickel catalyst. Such reaction has been described by Carter et al., J. Biol. Chem. 178, 325 (1949), as a laboratory preparation for 1,3-diamino acids from pyrazoline-3-carboxylic acids. Such a hydrogenation procedure, however, is handicapped for commercial development because the high pressures required (about 3500 lbs./in.$^2$) necessitate expensive high pressure equipment and this makes the process unattractive.

It has now been found according to this invention that aliphatic 1,3-diamines may be obtained readily by reacting at a pH between about pH 6 and pH 8 essentially equivalent amounts of hydrazine and an $\alpha,\beta$-ethylenically unsaturated aldehyde or ketone and subjecting the reaction product in situ to a low pressure hydrogenation, said hydrogenation being carried out in the presence of a Raney nickel catalyst and a co-catalyst comprising a base equivalent to or stronger than ammonia.

In carrying out this novel process, hydrazine or its hydrate is reacted with any of the wide variety of $\alpha,\beta$-ethylenically unsaturated aldehydes or ketones. Such aldehydes and ketones are characterized by the structural formula

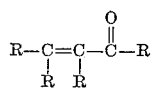

where R is a radical selected from the group of hydrogen and alkyl radicals containing from one to four carbon atoms (i.e., a lower alkyl radical). Thus, useful aldehydes include acrolein, methacrolein, crotonaldehyde, 2-methyl-2-butenal (tiglic aldehyde), $\beta$-methylcrotonaldehyde, 2-pentenal, $\alpha$-isopropyl acrolein, 2-hexenal, and the like. Ketones useful in this invention include methyl vinyl ketone, ethyl vinyl ketone, methyl propenyl ketone, methyl isopropenyl ketone, 2-methyl-1-pentene-3-one, and the like. Preferably, the aldehyde or ketone used will contain up to six carbon atoms.

The process is conveniently carried out in an aqueous, alcoholic, or aqueous alcoholic solution in two distinct steps. In the first step, a solution of aldehyde or ketone and hydrazine is refluxed for a short time (say 0.5 to 10 hours) to ensure complete reaction. It is important in this first step to avoid the presence of any strongly basic materials since strong bases at this point in the process will completely inhibit the reaction and prevent formation of the diamine product. Likewise, strong acids adversely affect the reaction by resulting in low yields and thus the pH of the reaction mass in this first step should be between about pH 6.0 and about pH 8.0. It is preferred to use an alcoholic solution (i.e. a lower aliphatic alcohol) as this permits a faster hydrogenation rate than does a purely aqueous system. The alcohol need not be anhydrous and 95% ethanol is preferred. Instead of using water or alcohol, other solvents may be used for the process. Ethers such as diethyl ether and dioxane, nitroalkanes (e.g. nitromethane) and other solvents inert to hydrazine, aldehydes and hydrogen may be used. It is also feasible to use in the first step solvents subject to reduction and strip such solvents from the system before the hydrogenation. For simplicity of operation, however, aqueous alcoholic solvent systems will be employed.

The amounts of aldehyde and hydrazine used will be essentially equimolar although a small excess (say 5% to 10%) of hydrazine is helpful to obtain optimum yields, but for economic reasons the hydrazine will be held to essentially equimolar amounts. It has been found, however, that when the molar ratio of aldehyde or ketone to hydrazine greatly exceeds 1:1 (say about 2:1) the yields of diamine are reduced to a very low value.

In the second step of this process the reaction products of the first step are hydrogenated without isolation at temperatures of about 50° to about 100° C. in the presence of a Raney nickel catalyst and a strong base as a co-catalyst. The hydrogenation pressure normally used is on the order of 100 to 300 pounds per square inch, but hydrogen uptake occurs also at pressures as low as 20 to 50 p.s.i.g. Thus this process permits use of low pressure equipment and results in an economical commercial process.

The presence of a base as co-catalyst during the hydrogenation step is essential in this process to obtain the benefits of reaction at low pressures. In the absence of the base the hydrogenation rate at low pressures is too slow for commercial use and yields of product are also significantly lower. The base used will be those well known basic materials having a basicity equivalent to or stronger than ammonia. Thus, examples of useful co-catalysts include ammonia, the alkali metal hydroxides (e.g. NaOH, KOH, etc.), the alkaline earth hydroxides (Ba(OH)$_2$, Ca(OH)$_2$, etc.), the alkali metal and alkaline earth metal carbonates (Na$_2$CO$_3$, BaCO$_3$, CaCO$_3$, etc.), the quaternary ammonium hydroxides (e.g. tetramethylammonium hydroxide and other tetra-lower alkylammonium hydroxides), and the like. Preferably, because of cost, availability and performance, ammonia and the alkali metal hydroxides (NaOH) will be used. The amount of co-catalyst employed will be that amount required to bring the pH of the solution to about pH 8 or higher. With caustic only a very small amount will be required, but with the weaker bases such as ammonia larger amounts will, of course, be required. When using ammonia the amount taken will usually be from 0.5 to 3 moles of ammonia per mole of hydrazine taken.

It is not known by what mechanism the reaction proceeds and data available do not establish that a pyrazoline is an intermediate. Regardless of the mechanism, however, this process permits production of aliphatic 1,3-diamines easily and at low costs.

In order to further illustrate the invention, the following examples are given:

EXAMPLE I

Aqueous Alcoholic System

A solution of two moles of crotonaldehyde (140 g.) in 250 ml. of 95% ethanol was added over a seven minute period to a stirred solution of hydrazine (2 moles, 118 grams 85% $H_2N.NH_2.H_2O$) in 250 ml. 95% ethyl alcohol. The pH of the solution was 8.0. An exothermic reaction took place and the temperature increased until the solution refluxed (about 83° C.). The solution was heated at reflux temperature for 16 hours and then cooled. To the cooled solution there was then added ammonia (1 mole, 59.2 grams aqueous 28.7% $NH_3$) and 23.5 grams 50% Raney nickel and the liquid (pH 9.0) was charged into a stainless steel autoclave using an additional 50 ml. of 95% ethyl alcohol to make the transfer quantitative. The autoclave was pressurized to 300 p.s.i.g. with hydrogen gas and then heated to 75° to 80° C. and mechanically rocked. During reaction the autoclave was held at 75° to 80° C. and periodically repressurized to 300 p.s.i.g. with hydrogen, the pressure varying during the hydrogenation down to 40 p.s.i.g. After hydrogenation (90% completed in 5 hours) the cooled reaction mixture was filtered and distilled. A fraction (B.P. 140–146° C.) was collected which weighed 124 g. and analyzed 92.3% 1,3-butanediamine representing a 65% yield based on weight of crotonaldehyde.

The above example was repeated except that the reflux time of the first step was reduced to 6 hours. The yield of 1,3-butanediamine was 45.7%.

In the absence of the ammonia co-catalyst in the second step of the above example the hydrogenation rate was impractically low (218 hours to complete hydrogen take-up) and the yield of product was only about 35%.

EXAMPLE II

Aqueous System

Ten moles of crotonaldehyde (700 g.) was added to a stirred solution of hydrazine (10 moles, 590 g. 85% $H_2N.NH_2.H_2O$) in 2500 ml. distilled water. The pH of the solution was 8.0. An exothermic reaction took place and the temperature increased until the solution refluxed. The solution was heated at reflux for 1.5 hours and then cooled. Ammonia (5 moles, 296 grams 28.7% $NH_3$) and Raney nickel (117.5 g. 50% Raney nickel) were added and the liquid (pH 9.0) was charged into a stainless steel autoclave using 100 ml. distilled water to make the transfer quantitative. The autoclave was pressurized to 300 p.s.i.g. with $H_2$ gas and then heated to 75° to 80° C. and mechanically stirred. During reaction the autoclave was held at 75° to 80° C. and periodically repressurized with hydrogen from about 80 p.s.i.g. to 300 p.s.i.g. After hydrogenation the cooled reaction mixture was filtered and an aliquot representing ⅕ of the reaction mixture was distilled. A fraction (B.P. 140–145° C.) was collected which weighed 96.0 grams and analyzed 91.5% 1,3-butanediamine representing a 50% yield based on weight of crotonaldehyde.

EXAMPLE III

Use of Other Bases as Co-Catalyst

Two moles of crotonadehyde (140 g.) was added to a stirred solution of hydrazine (2 moles, 118 g. 85% $H_2N.NH_3.H_2O$) in 500 ml. water (pH of solution 8.0). An exothermic reaction took place and the temperature increased until the solution refluxed (85° C.). The solution was held at reflux for 7.5 hours, then cooled. Sodium hydroxide (1 gram) was added to give a solution of pH value 11.4. This solution and Raney nickel (23.5 grams 50% Raney nickel) was charged into a stainless steel autoclave using an additional 50 ml. water to make the transfer quantitative. The autoclave was pressurized to 300 p.s.i.g. with hydrogen gas and then heated to 75° to 80° C. and mechanicaly rocked. During the reaction the autoclave was held at 75° to 80° C. and repressurized periodically with hydrogen from about 20 p.s.i.g. to 300 p.s.i.g. After hydrogenation (3.5 hours) the cooled reaction mixture was filtered and distilled. A fraction (B.P. 140–145° C.) was collected which weighed 114 grams and analyzed 95.1% 1,3-butanediamine representing a 61.5% yield based on weight of crotonaldehyde.

Instead of using caustic as co-catalyst, sodium carbonate, calcium hydroxide, and tetramethylammonium hydroxide may be used with equivalent results.

EXAMPLE IV

When Example III is repeated except that the aldehyde used is methacrolein the product 2-methylpropanediamine-1,3 is obtained in approximately 50% yield.

EXAMPLE V

When the details of Example I are followed with ethyl vinyl ketone instead of crotonaldehyde, 1,3-diaminopentane is obtained in approximately 40% yield.

In like manner β-methyl crotonaldehyde yields 3-methylbutanediamine-1,3 and 2-methyl-1-pentene-3-one yields 2-methylpentanediamine-1,3 in comparable yields.

EXAMPLE VI

Mole Ratio Aldehyde to Hydrazine 2:1

Two moles of crotonaldehyde (140 g.) was added to a solution of hydrazine (1 mole, 59 g. 85% $H_2N.NH_2.H_2O$) in 500 ml. of 95% ethyl alcohol. An exothermic reaction took place and the temperature increased until the solution refluxed. The solution was held at reflux for 20 minutes and then cooled. To the cooled solution was added ammonia (3 moles, 178 grams 28.7% $NH_3$) and 23.5 grams Raney nickel catalyst and the mixture was charged into a stainless steel autoclave using an additional 50 ml. 95% ethyl alcohol to make the transfer quantitative. The autoclave was pressurized to 300 p.s.i.g. with hydrogen gas and then to 75° to 80° C. and mechanically rocked. During reaction the autoclave was held at 75° to 80° C. and repressurized periodically with hydrogen to 300 p.s.i.g. After hydrogenation the cooled reaction mixture was filtered and distilled. A fraction (B.P. 140–150° C.) was collected which weighed 20.4 grams and analyzed 56.6% 1,3-butanediamine representing a 6.55% yield based on weight of crotonaldehyde.

It is evident from the above description and examples that this invention provides for a simple economical means for obtaining aliphatic 1,3-diamines. In view of the low pressures required for the hydrogenation, the ease of operation in conventional equipment, the use of readily available materials and the versatility of the process as to specific diamines that may be obtained, it is obvious that the process of this invention represents a significant advance in the art.

It will be understood that numerous variations and changes may be made from the above description and examples without departing from the spirit and scope of the invention.

I claim:

1. A process for the preparation of 1,3-diamines which comprises the steps of (1) reacting in an inert solvent and at ambient temperature at a pH between about 6 and 8 essentially equimolar amounts of hydrazine and a compound selected from the group of aliphatic α,β-ethylenically unsaturated aldehydes and ketones and (2) without isolation subjecting the reaction product to hydrogenation with a Raney nickel catalyst at a temperature between about 50° and about 100° C., at a pressure not exceeding about 300 p.s.i.g. and at a pH of at least about 8.

2. A process for the preparation of 1,3-diamines which comprises the steps of (1) reacting in an aqueous alcoholic solution and at ambient temperature at a pH between about pH 6 and about pH 8 essentially equimolar amounts of hydrazine and an ethylenically unsaturated compound of structure

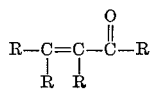

where R is a radical selected from the group of hydrogen and lower alkyl radicals and (2) without isolation subjecting the reaction product obtained in step (1) to hydrogenation with a Raney nickel catalyst at a temperature between about 50° and about 100° C., at a pressure not exceeding 300 p.s.i.g. and at a pH of at least about 8.

3. The process of claim 2 wherein the unsaturated compound is an aldehyde.

4. The process of claim 3 wherein the aldehyde is crotonaldehyde.

5. The process of claim 3 wherein the aldehyde is methacrolein.

6. The process of claim 3 wherein in step (2) the pH is adjusted with ammonia.

7. The process of claim 3 wherein in step (2) the pH is adjusted with sodium hydroxide.

8. The process of claim 2 wherein the unsaturated compound is a ketone.

9. The process of claim 8 wherein the ketone is ethyl vinyl ketone.

References Cited in the file of this patent
FOREIGN PATENTS
615,715    Great Britain _____ Jan. 11, 1949

OTHER REFERENCES

Balbiano: Gaz. Chim. Ital., vol. XVIII, pp. 354–79 (1888).

Carter et al.: J. Biol. Chem., vol. 178, pp. 325–34 (1949).